Feb. 23, 1937.　　　H. A. WILLIAMS ET AL　　　2,071,370

FLASH LIGHTING DEVICE

Filed Jan. 24, 1934

INVENTORS:
HARRY A. WILLIAMS
ENRIQUE G. TOUCEDA
BY
ATTORNEYS

Patented Feb. 23, 1937

2,071,370

UNITED STATES PATENT OFFICE 2,071,370

FLASH LIGHTING DEVICE

Harry A. Williams and Enrique G. Touceda, Albany, N. Y.

Application January 24, 1934, Serial No. 708,082

14 Claims. (Cl. 67—29)

In the art of photography, many pictures are taken with the aid of flash lights. The exposures, in this case, should be made during the range of maximum brilliancy of light emission in order to obtain a clearly defined image on the film or plate. This can be accomplished with some degree of accuracy under favorable circumstances. However, the majority of flash light pictures must be taken under adverse conditions. For example, the object may be in motion. It is known that timed exposures or exposures of ordinary duration could not be made in order clearly to photograph an object in motion. On the contrary, a very short exposure, say of the order of 1/100th or 1/200th of a second or shorter, is necessary. Furthermore, with short exposures, it is evident that the flash light must be very accurately synchronized or timed with the camera shutter in order to insure clear and well defined pictures.

Flash lamps or flash light powders are the illuminating means usually employed at the present time by photographers. Electrically, an ignition device comprising a resistance element is relied upon which becomes incandescent when current is supplied thereto and ignites the combustible or oxidizable substance. This type of ignition necessarily involves an appreciable and variable time element in view of the precision which is defined by the shutter speed of the camera in conjunction with which it is used.

Our invention, therefore, has for a first object the provision of an electrical ignition device for flash light powders and similar substances wherein the time interval required to produce ignition is well within the range permissible by so-called "snap-shot" shutter speeds of cameras.

A further object resides in the provision of means whereby our ignition device may be synchronized with a high-speed camera shutter or equivalent mechanism.

With these and other objects in view, our invention includes the novel elements and combinations and arrangements thereof described below and illustrated in the accompanying drawing in which—

In the drawing, like reference characters indicate like parts throughout the various figures.

Figure 1:
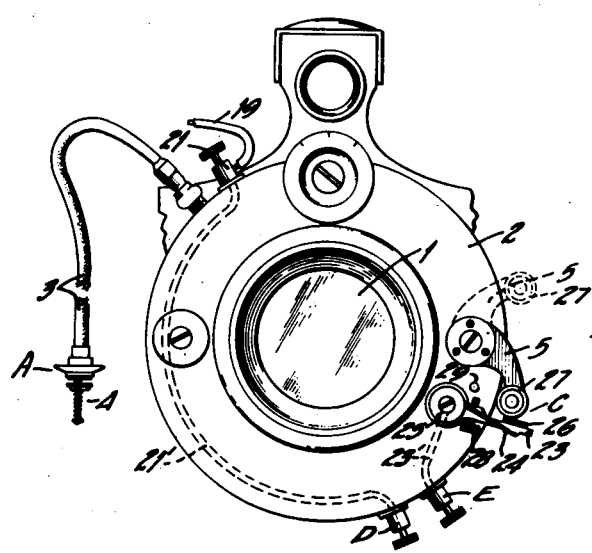
Fig. 1 is a fragmentary front elevation of a camera illustrating the circuit controls associated therewith.

Referring particularly to Fig. 1, 1 indicates a lens of a camera secured to a shutter housing 2 within which is suitably positioned a shutter and operating mechanism therefor. The trigger of the shutter release mechanism, indicated generally at A, is illustrated as comprising the flexible tube 3 which is attached at one end with a coupling connection to the shutter housing 2. At the other end of the tube is a manually operable push button, indicated generally at 4 which serves through intermediate means extending through the tube 3, to release the shutter. A shutter setting mechanism is also associated with the shutter and comprises a setting lever 5 which is pivotally mounted on the face of the shutter housing 2. The parts of the shutter release and setting mechanisms illustrated in the drawing and referred to above serve sufficiently to indicate by way of example those parts of a camera which we prefer to employ to control the electrical circuit, hereinafter described, which forms an element of our invention. Furthermore, it is to be understood that the invention is not limited to the precise camera mechanism shown, for our device may be adapted for use with any type of photographic instrument and control mechanisms therefor.

The release trigger, indicated at A, comprises a body portion 6 provided with an annular flange 7 forming a finger grip, the push button 8 being adapted normally to rest against the ball of the thumb. An axially extending opening 9 is provided in the body 6 in which is fitted and slidably mounted the stem 10 of the push button. The inner end of stem 10 is suitably connected by metallic means, not illustrated, but which is generally a flexible wire extending through the tube 3, to the shutter release mechanism. A compression spring 11, surrounding stem 10, is interposed between the button 8 and a shoulder 12 of the body 6 and normally maintains the stem outwardly in extended position. In conformance with our invention, the body 6, which is preferably molded or otherwise fabricated of insulating material, is designed to comprise an electrical switch mechanism, indicated generally at B, operable with the normal operation of the push button 8. The switch, in the embodiment illustrated, comprises an annular, flanged member 13 suitably secured in the body 6 to expose the lower face of the flange 13a thereof in cooperative relationship with an annular, conducting member 17 which is grounded to the shutter housing through the stem 10 and the aforesaid wire. The member 17 is slidably mounted on the stem 10 and normally positioned with respect thereto by the spring 11. A terminal comprising a set screw 18 serves to connect conductor 19 to the member 13. The conductor 19 is preferably wrapped about the tube 3, or may, if desired, be permanently built therein, and is connected at the other end to a binding post 21 on the shutter housing but which is insulated therefrom. Binding post 21 is electrically connected by conductor 21' to binding post D mounted in the shutter housing but insulated therefrom. Initially, when the push button 8 is depressed, spring 11 is compressed thereby pressing member 17 against the flanged portion 13a of member 13 and electrically connecting binding post D through conductor 21', binding post 21 and conductor 19 to the ground or shutter housing which is assumed to be of metal. Upon a further depression of button 8, spring 11 retains member 17 in yielding engagement with the flange 13a and at the same time permits stem 10 to slide therethrough. The switch B for initially controlling the operation of our circuit is designed to close somewhat before the trigger releases the shutter.

Figure 5:
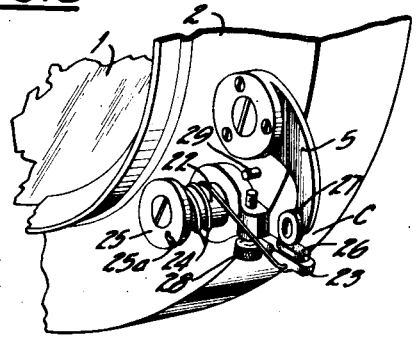
Fig 5 is a fragmentary, perspective view of a shutter housing illustrating a second control mounted on the face thereof.
Figure 4:
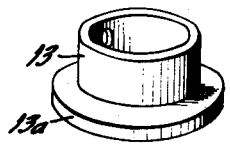
Fig. 4 is a perspective detail view of an element of the control illustrated in Figs. 2 and 3.

A second control for our circuit which comprises a switch indicated generally at C in Figs. 1 and 5, is operable in timed relation with the shutter operating mechanism. To attain this end, we have illustrated the shutter setting lever 5, which is understood to be grounded to the metal shutter housing as comprising one element of the switch C, although it is conceivable to accomplish this timing or synchronization in various other ways. A stub shaft 22, which extends through an insulating bushing 22' in the shutter housing 2 of the camera and is secured by a nut 60, supports an arm 23 which is rotatably mounted thereon. A torsion spring 24 is disposed around shaft 22, one end thereof being secured to the arm 23 near its outer extremity and the other end being retained in a slot 25a in a cap 25 secured to the end of the stub shaft 22. The spring 24 serves to urge the arm 23 toward the shutter setting lever 5 so that a contact 26 on arm 23 normally bears against a contact 27 on lever 5. The contact 27 is preferably rotatably mounted on trigger 5 to permit firm and continued contact thereof with contact 26 during a predetermined, relative movement of the two members. The arm 23 is also provided with a threaded opening in which an adjusting screw 28 is received. Screw 28 is positioned to engage a pin 29 secured to the housing 2 and hence serves as an adjustable stop to regulate the length of arc described by the arm 23. Obviously, the limit of travel of arm 23 in the reverse direction is determined by the lever 5 of the shutter setting mechanism. The contact 26 is electrically connected to binding post E through arm 23, stub shaft 22 and conductor 23'.

It is to be understood that the binding posts D and E are provided in order that the controls associated with the camera may readily be connected in circuit with the other electrical elements of our device.

Having described the controls B and C in conjunction with the camera control mechanisms, the following description of the circuit with which they are associated will clearly indicate the cooperative relationship of the various elements forming part of our novel device.

Figure 7:
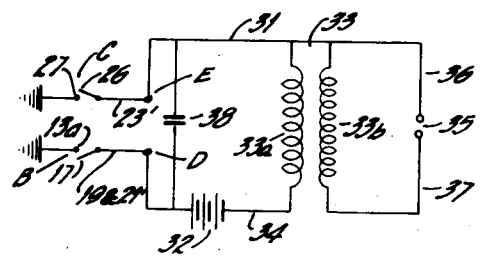
Fig. 7 is a wiring diagram of our preferred circuit.
Figure 3:
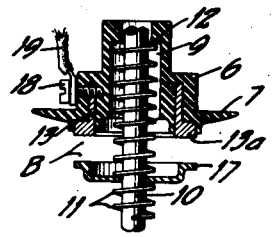
Fig. 3 is a slightly enlarged fragmentary sectional elevation view of Fig. 2.

One form of our invention comprises the electrical circuit illustrated in Fig. 7. A source of electrical energy, indicated as a battery 32, is connected in series with the controls or switches B and C and the primary 33a of an induction coil or transformer 33. The connections are made through the conductors 21' and 19, the ground and conductors 23', 31 and 34, respectively, as the circuit is traced from the battery in a clockwise direction. An end of each of the primary and secondary coils, 33a and 33b, respectively, are connected together and terminals forming a spark gap indicated at 35 are connected through conductors 36 and 37 across the secondary of coil 33. The battery 32 may comprise a plurality of of dry cells providing a source of electrical energy of the order of about 6 volts. Furthermore, a condenser 38 is preferably connected across the switch C to reduce sparking when said switch is opened.

It is to be understood that the spark gap 35 may be conveniently positioned to ignite a combustible or readily oxidizable substance as, for example, flash light powder or any other suitable substance adapted to emit light upon an oxidation or other activation thereof. Furthermore, it will be evident from the following description of the operation of our device and the function of the various elements thereof that a high degree of accuracy is attainable therewith in synchronizing the production of the light emission with a camera shutter or equivalent mechanism.

Assuming that a suitable flash lighting substance is disposed within effective igniting or activating range of the spark gap 35, and that the setting lever 5 of the camera is in the starting position illustrated in full lines in Fig. 1, our circuit and associated mechanisms are positioned in readiness for an operation in timed relationship with the camera shutter. In other words, the switch B, which is operable with the release trigger A, is in open position, and the switch C is closed due to the fact that the shutter has been set with the lever 5 and is ready to be released. When the button 8 is depressed, the conducting member 17 establishes contact with the flange 13a and thence the switch B is closed.

It will be noted that switch B is designed to close before the push button 8 is depressed sufficiently to operate the shutter release mechanism. The precedence of operation of switch B permits a sufficient interval of time to elapse during which the circuit is closed through the primary of coil 33 thoroughly to saturate the magnetic circuit before switch C is opened to effect a collapse thereof.

Following the operation of the shutter release mechanism, the shutter timing or operating mechanism governs the rapidity with which the exposure is made. In so doing, the lever 5 rotates with the opening and closing of the shutter from the full line to the dotted line position illustrated in Fig. 1. The arm 23, being urged by the torsion spring 24 toward the lever 5, maintains a closed circuit between the contacts 26 and 27 during a portion of the rotation of lever 5. When the screw 28 strikes the pin 29 the movement of the arm 23 stops while lever 5 continues rotating thereby separating contacts 26 and 27. From the foregoing, it is obvious that the switch C is designed and adjusted to open after a predetermined degree of shutter operation, in that the movement of trigger 5 is indicative of the movement of the shutter. A sudden opening of switch C produces a surge of high potential in the secondary of coil 33 which is substantially instantaneously dissipated through a spark discharge between the terminals of the spark gap 35, the spark serving to ignite or activate a light giving substance disposed within effective igniting or activating range thereof. It will be noted that the time element of operation of our ignition device following an opening of switch C is negligible as compared with the shutter speed for short exposures. Hence flash light powders and similar substances may be ignited by our device and the ignition thereof timed with respect to the shutter opening with a very high degree of accuracy.

It is to be understood that we do not wish to be limited to the exact elements included in our circuit which have been illustrated and described as preferred means which we may use for producing a spark ignition and synchronizing the production thereof with a camera.

Figure 10:
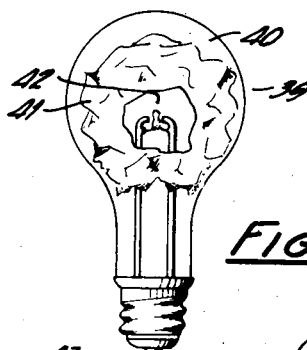
Fig. 10 is an elevation view of a flash lamp equipped with our spark gap forming terminals.
Figures 8, 9:
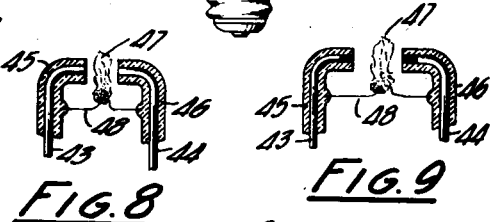
Fig. 8 is an enlarged, detail view of the spark gap terminals illustrating a preferred disposition of an oxidizable substance with respect thereto.
Fig. 9 is an enlarged, detail view of a modified form of terminals for the spark gap.
Figure 2:
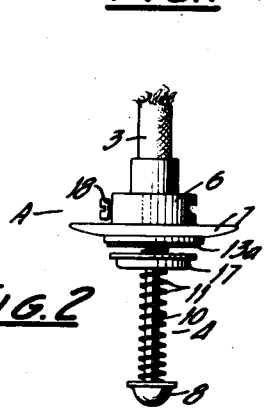
Fig. 2 is an elevation view of one of the controls.
Figure 6:
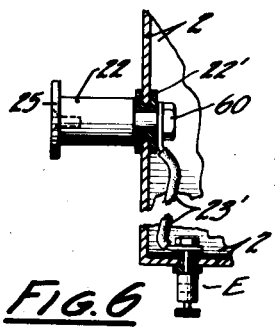
Fig. 6 is a fragmentary, sectional view through the shutter housing illustrating a form of mounting for an element of one of the controls.

In Figs. 8, 9, and 10, we have illustrated a flash lamp and details of the preferred forms of spark gap forming terminals comprising the ignition means disposed therein, embodiments of which are more specifically described and illustrated in our copending application Ser. No. 708,081, which was filed in the Patent Office on or about the 24th day of January, 1934. The flash lamp, indicated generally at 39 comprises a translucent bulb 40 having the configuration of an ordinary incandescent lamp and filled with an oxygen gas and a suitable amount of an oxidizable substance 41 preferably comprising a foil which is adapted to emit light upon an oxidation thereof. The ignition means adapting this lamp for use with our circuit is indicated generally at 42 and comprises the conductors 43 and 44 terminating at points spaced from each other to form the terminals of a spark gap (see Fig. 8). The conductors 43 and 44 are enclosed in insulating casings 45 and 46, respectively, and connect with terminals in the screw base of the lamp in the usual manner. To aid in the ignition of the oxidizable substance, a small amount of a fulminating substance 47 is preferably disposed within ignition range of the spark gap. By way of example, we have illustrated the fulminating substance 47 as supported by a wire 48 secured between the insulating casings of the conductors.

In Fig. 9, we have illustrated a modified form of spark gap, the terminals of which are formed of carbon or similar substance which partially disintegrates upon the passage of a spark, ejecting particles of incandescent material. The ejected particles effect a wider ignition range and generally aid in the ignition of the oxidizable materials within the bulb.

Very accurately timed high speed exposures of a falling billiard ball or a white disk attached to the hand of a synchronous clock making sixty revolutions per minute, and illuminated by a flash from the present types of flash lamp indicate three things very clearly; first, that there is a very substantial lag or interval of time between the making of the circuit which ignites the flash lamp and the actual ignition thereof; second, that this interval varies even with different flash lamps of the same manufacture and to such a substantial degree that the illumination cannot be positively synchronized with an exposure of less than 1/50 of a second; and third, that once ignition of the material in the flash lamp has actually taken place, maximum illumination is almost instantaneous.

It is obvious from the foregoing that the defects in the present type of flash lamp are due primarily to the relatively long and variable period of time which elapses between the closing of the ignition circuit and the actual ignition of the flash light material.

With modern high speed lenses and extremely fast plates or films, exposures as short as 1/1000 of a second are not unusual and exposures very much shorter than 1/50 of a second (the minimum synchronizing limit of the present flash lamp) are absolutely necessary to obtain clear pictures of an object moving even at moderate speed.

With our apparatus, using a high potential spark as a means for activating a light giving reaction between the oxidizable material and the oxygen of the air or in the bulb of the flash lamp or otherwise, the time differential between the instant of breaking the primary circuit and the ignition or activation of the light giving material is not only so very much shortened that it may be said to be substantially instantaneous but it is also made substantially constant. This last characteristic is of the utmost importance because it permits precise synchronization of light with shutter opening. With variations in the above time differential as small as 1/50 of a second which is quite usual in the present type of flash lamp, it is obviously impossible to photograph anything with any degree of certainty with an exposure as short as 1/100 of a second because the light, in one case may occur before the shutter has opened, and in the next case after the shutter has closed.

Without any precautions as to standardizing conditions and using ordinary flash light powder in the open air and a small piece of guncotton between carbon spark gap terminals, with our apparatus one can readily synchronize the flash with exposures of much shorter duration than has heretofore been successfully accomplished even with flash lamps.

In a flash lamp containing oxygen gas and foil as described, and using carbon spark gap terminals (preferably spongy or porous carbon which will be permeated with the oxygen), and either with or without guncotton or a similar flame propagating substance, the light may be consistently synchronized with exposures of a very much higher speed. In the presence of oxygen alone, the carbon becomes almost explosive and even in the air the spark really partakes of the nature of a flaming arc, and incandescent particles of carbon are projected violently from the terminals which in either case facilitates ignition.

The word "light" as used in the specification and claims is to be understood as meaning and including light rays both visible and invisible and by the use of which it is possible to take a photograph; and the word "translucent" is to be understood as meaning and including "transparent" and having the general property of transmitting such "light".

Likewise, the term "shutter operating mechanism" as used in the claims is to be understood as meaning the mechanism which drives the shutter and moves in positively timed relation therewith as distinguished from the manually operated means for releasing or setting this mechanism in operation. Except for a manual adjustment whereby the duration of the shutter opening may be set prior to the exposure, the movement of high-speed shutters of the character illustrated, described and contemplated hereunder, is entirely independent of the operator after the driving or operating mechanism is once released.

While we have described our invention in its preferred embodiments, it is to be understood that the words which we have used are words of description rather than of limitation. Hence, changes within the purview of the appended claims may be made without departing from the true scope and spirit of our invention in its broader aspects.

What we claim is:

1. In a camera, the combination with a shutter of the high-speed type and operating mechanism for driving said shutter at a speed to provide an exposure of the order of 1/50 of a second or shorter, of operator controlled means for releasing said driving means, an electric switch adapted to be connected in a flash light igniting or activating circuit, and means independent of said operator controlled means and correlated with said shutter operating mechanism for automatically effecting an opening of said switch.

2. In a camera, the combination with a shutter of the high-speed type provided with operating mechanism for driving said shutter at a speed to provide an exposure of the order of 1/50 of a second or shorter, of operator controlled means for releasing said driving means, an electric switch adapted to be connected in a flash light igniting or activating circuit, means independent of said operator controlled means and correlated with said shutter operating mechanism for automatically effecting an opening of said switch, and means for positively varying the time interval between the switch opening and the maximum shutter opening to synchronize maximum illumination from the flash light with the shutter opening.

3. In a camera, the combination with a shutter of the high-speed type and operating mechanism for driving said shutter at a speed to provide an exposure of the order of 1/50 of a second or shorter, of operator controlled means for releasing said driving means, an electric switch adapted to be connected in a flash light igniting or activating circuit, and means independent of said operator controlled means and moving in positively timed relation with said driving mechanism during the opening of said shutter automatically to effect an opening of said switch.

4. In a device of the character described, the combination with a camera shutter of the high-speed type and operating mechanism for driving said shutter at a speed to provide an exposure of the order of 1/50 of a second or shorter, of operator controlled means for releasing said driving means, a first electric circuit including a source of power, means for closing said circuit, a second circuit inductively coupled with said first circuit and including spaced terminals adapted to be positioned within effective igniting or activating range of a flash lighting material, and means independent of said operator controlled means and moving in positively timed relation with said driving mechanism during the opening of said shutter for opening said first circuit.

5. In a device of the character described, the combination with a camera shutter of the high-speed type provided with operating mechanism for driving said shutter at a speed to provide an exposure of the order of 1/50 of a second or shorter, of an electric switch adapted to be connected in a flash light igniting or activating circuit, manually operated means for releasing said driving means, and means independent of said manually operated means and moving in positively timed relation with said driving means during the opening movement of said shutter for opening said switch.

6. The device set forth in claim 3 together with means for positively varying the interval between the switch opening and the maximum shutter opening.

7. The device set forth in claim 4 together with means for positively varying the interval between the switch opening and the maximum shutter opening.

8. The device set forth in claim 5 together with means for positively varying the interval between the switch opening and the maximum shutter opening.

9. In a device of the character described, the combination with a camera shutter of the high-speed type provided with operating mechanism for driving said shutter at a speed to provide an exposure of the order of 1/50 of a second or shorter, of a flash lamp comprising a translucent envelope enclosing a rapidly oxidizable substance adapted to emit light upon oxidation thereof and also means forming a spark gap disposed within effective igniting range of said substance, a first electric circuit including a source of power, means for closing said first circuit, a second electric circuit, including said spark gap forming means, inductively coupled with said first circuit, and means correlated with said shutter driving mechanism for opening said first circuit.

10. In a device of the character described, the combination with a camera shutter of the high-speed type and operating mechanism for driving said shutter at a speed to provide an exposure of the order of 1/50 of a second or shorter, of a first electric circuit including a source of power, means for closing said circuit, a second circuit inductively coupled with said first circuit and including spaced terminals adapted to be positioned within effective igniting or activating range of a flash lighting substance, and means correlated with said shutter driving mechanism and independent of said first circuit closing means for opening said first circuit to effect a light-giving activation of said substance.

11. In a device of the character described, the combination with a camera shutter of the high-speed type and operating mechanism for driving said shutter at a speed to provide an exposure of the order of 1/50 of a second or shorter, of a first electric circuit including a source of power, means for closing said circuit, a second circuit inductively coupled with said first circuit and including spaced terminals adapted to be positioned within effective igniting or activating range of a flash lighting substance, means correlated with said shutter driving mechanism and independent of said first circuit closing means for effecting an opening of said first circuit, and means for varying the time interval between the opening of said first circuit and the maximum shutter opening; whereby maximum illumination from the flash lighting material may be synchronized with the shutter opening.

12. In a device of the character described, the combination with a camera shutter of the high-speed type and operating mechanism for driving said shutter at a speed to provide an exposure of the order of 1/50 of a second or shorter, of means for setting said mechanism for operation, means for releasing said mechanism, and an electric switch adapted to be connected in a flash light activating or igniting circuit; the opening movement of said switch being actuated by said setting means.

13. In a device of the character described, a camera shutter, operating mechanism for driving said shutter at a speed to provide an exposure of the order of 1/50 of a second or shorter, a flash light device, an induction coil having primary and secondary winding, a first electric circuit including said primary winding and a source of electric power, a second electric circuit including said secondary winding and spaced terminals disposed within effective igniting or activating range of said flash light device, manually operated means for initiating the closure of the first circuit including means for releasing the shutter operating mechanism to effect the exposure, and means moving in positively timed relation with the shutter operating mechanism independent of said manually operated means to effect an opening of said first circuit.

14. In a camera, the combination with a high-speed shutter and operating mechanism for driving said shutter at a speed to provide exposures of the order of 1/50 of a second or shorter, of means for setting said driving mechanism for operation, operator controlled means for releasing said mechanism after the setting thereof to effect an exposure, an electric switch adapted to be connected in a flash light activating or igniting circuit, and means controlled by said shutter driving mechanism and independent of said operator controlled releasing means for effecting an opening movement of said switch.

HARRY A. WILLIAMS.
ENRIQUE G. TOUCEDA.